United States Patent
You

(10) Patent No.: US 12,443,413 B2
(45) Date of Patent: Oct. 14, 2025

(54) MEMORY DEVICE AND STORAGE DEVICE INCLUDING THE SAME

(71) Applicant: SK hynix Inc., Gyeonggi-do (KR)

(72) Inventor: Byoung Sung You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 169 days.

(21) Appl. No.: 18/301,992

(22) Filed: Apr. 18, 2023

(65) Prior Publication Data
US 2024/0184589 A1    Jun. 6, 2024

(30) Foreign Application Priority Data

Dec. 5, 2022 (KR) .................. 10-2022-0167560

(51) Int. Cl.
G06F 9/38 (2018.01)
G06F 9/48 (2006.01)
G06F 9/52 (2006.01)

(52) U.S. Cl.
CPC .......... *G06F 9/3887* (2013.01); *G06F 9/4812* (2013.01); *G06F 9/526* (2013.01)

(58) Field of Classification Search
None
See application file for complete search history.

(56) References Cited

U.S. PATENT DOCUMENTS

| 2014/0281735 A1* | 9/2014 | Olivarez ............. G06F 11/2242 714/40 |
| 2015/0074337 A1 | 3/2015 | Jo et al. |
| 2015/0095600 A1 | 4/2015 | Bahnsen et al. |
| 2018/0365080 A1* | 12/2018 | Wang ...................... G06F 16/27 |

* cited by examiner

*Primary Examiner* — Scott C Sun
(74) *Attorney, Agent, or Firm* — IP & T GROUP LLP

(57) ABSTRACT

A memory device may include a plurality of subcores and a main core configured to control a subcore of the plurality of subcores to perform a preprocessing task of a memory operation in response to a preprocessing command.

6 Claims, 5 Drawing Sheets

MEMORY DEVICE AND STORAGE DEVICE INCLUDING THE SAME

CROSS-REFERENCES TO RELATED APPLICATION

The present application claims priority under 35 U.S.C. § 119(e) to Korean Patent Application No. 10-2022-0167560, filed on Dec. 5, 2022, which is incorporated herein by reference in its entirety.

BACKGROUND

1. Technical Field

Various embodiments of the present disclosure relates to a storage device including a memory device.

2. Related Art

A storage device is configured to store data that is provided by an external device (i.e., host), in response to a write request from the external device. Furthermore, the storage device is configured to provide the external device with data that is stored in the storage device, in response to a read request from the external device. The external device may include an electronic device capable of processing data, such as a computer, a digital camera, or a mobile phone. The storage device may be embedded in the external device, or may be fabricated as a separate apparatus connected to the external device. The storage device may include a memory device for storing data and a controller for controlling the memory device.

An operation that is performed in the memory device may include a plurality of detailed tasks. Some tasks of the detailed tasks may be performed while a target location of a memory region is not specified. Such a characteristic allows the memory device to perform tasks more efficiently, thereby the latency of an operation of the memory device can be greatly reduced.

SUMMARY

A memory device according to an embodiment of the present disclosure may include: a plurality of subcores; and a main core configured to control a subcore of the plurality of subcores to perform a preprocessing task of a memory operation in response to a preprocessing command.

A memory device according to an embodiment of the present disclosure may include: a plurality of subcores; and a main core configured to unlock a subcore of a plurality of subcores, which is to perform a task in response to a command, and lock the subcore when the subcore completes the task.

A storage device according to an embodiment of the present disclosure may include: a memory device; and a controller configured to: determine one or more preprocessing tasks of an operation to be performed by the memory device, transmit, to the memory device, preprocessing commands corresponding to the preprocessing tasks, and transmit, to the memory device, an operation command corresponding to the operation after transmitting the preprocessing commands.

A method of operating a storage device including a controller and a memory device according to an embodiment of the present disclosure may include: determining, by the controller, one or more preprocessing tasks of an operation to be performed by the memory device; transmitting, by the controller, preprocessing commands corresponding to the preprocessing tasks to the memory device; and transmitting, by the controller, an operation command corresponding to the operation after transmitting the preprocessing commands to the memory device.

DETAILED DESCRIPTION

Hereinafter, embodiments of the present disclosure will be described in detail with reference to the accompanying drawings.

Various embodiments of the present disclosure provide a memory device capable of reducing the latency of a memory operation and a storage device including the memory device.

The memory device and the storage device including the memory device according to embodiments of the present disclosure can reduce the latency of a memory operation.

Figure 1:
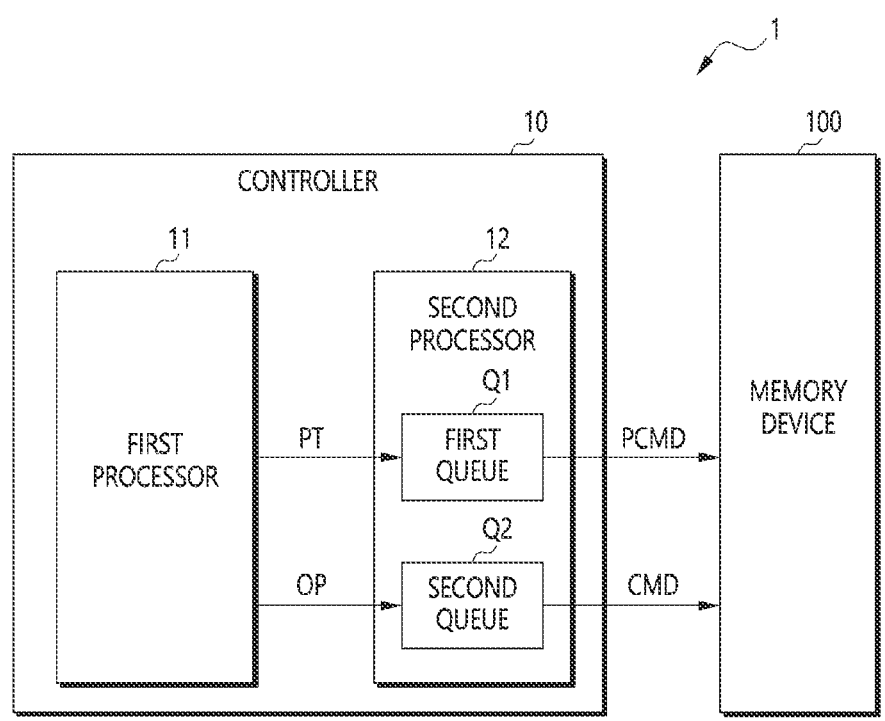
FIG. 1 is a block diagram illustrating a storage device according to an embodiment of the present disclosure.

FIG. 1 is a block diagram illustrating a storage device 1 according to an embodiment of the present disclosure.

Referring to FIG. 1, the storage device 1 may store data that has been received from an external device (e.g., a host device), in response to a write request from the host device. Furthermore, the storage device 1 may provide the host device with data that has been stored in the storage device 1, in response to a read request from the host device.

The storage device 1 may include a personal computer memory card international association (PCMCIA) card, a SmartMedia card, a memory stick, various multimedia cards (e.g., an MMC, an eMMC, an RS-MMC, and MMC-micro), secure digital (SD) cards (e.g., SD, mini-SD, and micro-SD), a universal flash storage (UFS), a solid state drive (SSD), or the like.

The storage device 1 may include a memory device 100 and a controller 10.

The memory device 100 may operate under the control of the controller 10. Operations of the memory device 100 may include a read operation, a program operation, and an erase operation. An operation of the memory device 100 may include plural tasks. The tasks may be divided into one or more preprocessing tasks and one or more main tasks. The main tasks may include a sub-operation of accessing, by the memory device 100, a target location in a memory region (not illustrated) and a sub-operation performed by the memory device 100 after accessing the target location. The preprocessing tasks may include a sub-operation of setting, by the memory device 100, peripheral circuits at a target location in order to access the target location and a sub-operation capable of being performed by the memory device 100 before accessing the target location.

The memory device 100 may include various types of a memory, such as a NAND flash memory, a 3D NAND flash memory, a NOR flash memory, a resistive random access memory (RRAM), a phase change random access memory (PRAM), a magnetoresistive random access memory (MRAM), a ferroelectric random access memory (FRAM), or a spin transfer torque random access memory (STTRAM).

The controller 10 may control an overall operation of the storage device 1. The controller 10 may control the memory device 100 in response to a request from the host device. For example, the controller 10 may store, in the memory device 100, data that has been transmitted by the host device, in response to a write request from the host device. Further, the controller 10 may read data from the memory device 100 in response to a read request from the host device, and may transmit the data to the host device.

Furthermore, the controller 10 may control the memory device 100 to perform a management operation that is internally required, independently of the host device, that is, although a request is not received from the host device. For example, the management operation may include a wear labeling operation, a garbage collection operation, and an erase operation. According to an embodiment, the management operation may be performed in response to a request from the host device.

The controller 10 may include a first processor 11 and a second processor 12. The second processor 12 may include a first queue Q1 and a second queue Q2. Each of the first queue Q1 and the second queue Q2 may consist of a hardware queue or a software queue.

The first processor 11 may queue one or more preprocessing tasks PT of an operation OP to be performed by the memory device 100 in the first queue Q1, and may queue the operation OP to be performed by the memory device 100 in the second queue Q2. The preprocessing tasks PT may be predetermined based on the type of operation OP of the memory device 100.

The first queue Q1 may have a priority over the second queue Q2. That is, the second processor 12 may process items of the first queue Q1 before items of the second queue Q2. Specifically, the second processor 12 may generate one or more preprocessing commands PCMD corresponding to one or more preprocessing tasks PT, respectively, which have been queued in the first queue Q1, and may transmit the one or more preprocessing commands PCMD to the memory device 100. Each of the preprocessing commands PCMD may instruct the memory device 100 to perform a preprocessing task PT corresponding to a preprocessing command PCMD.

Furthermore, after the transmission of the one or more preprocessing commands PCMD, the second processor 12 may generate an operation command CMD corresponding to the operation OP that has been queued in the second queue Q2, and may transmit the operation command CMD to the memory device 100. The operation command CMD, subsequent to the preprocessing command PCMD, may instruct the memory device 100 to perform one or more main tasks of the operation OP corresponding to the operation command CMD.

The memory device 100 may perform the preprocessing task PT corresponding to the preprocessing command PCMD, in response to the preprocessing command PCMD. The memory device 100 may perform one or more main tasks of the operation OP corresponding to the operation command CMD, in response to the operation command CMD.

Accordingly, since one or more preprocessing tasks PT are performed before the operation command CMD is received, the latency can be reduced and operation performance of the storage device 1 can be improved.

Figure 2:
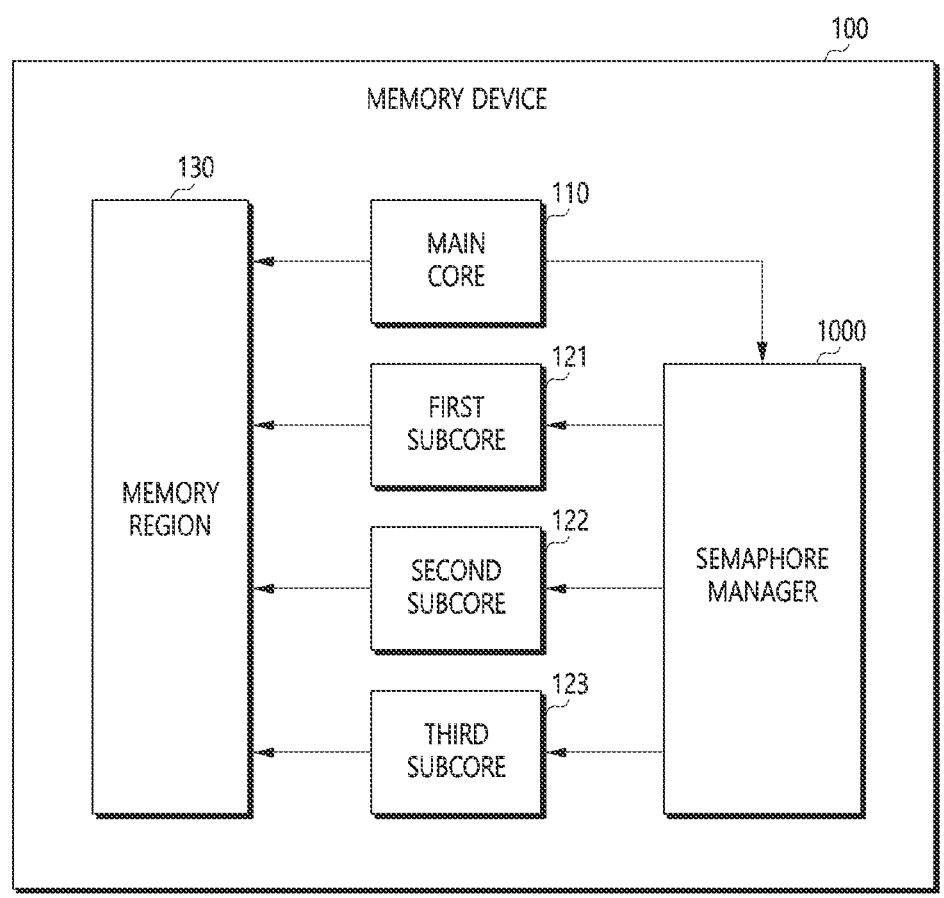
FIG. 2 is a block diagram illustrating a memory device shown in in FIG. 1.

FIG. 2 is a block detailed diagram of the memory device 100 shown in FIG. 1.

Referring to FIG. 2, the memory device 100 may include a main core 110, a plurality of subcores 121 to 123, a memory region 130, and a semaphore manager 1000. For example, first to third subcores 121 to 123 may be included in the memory device 100.

The main core 110 may control an overall operation of the memory device 100. The main core 110 may receive a command from the controller 10, may identify one or more tasks to be performed in response to the command, and may control the first to third subcores 121 to 123 to perform the identified tasks. Specifically, the main core 110 may receive the preprocessing command PCMD from the controller 10, may identify a preprocessing task PT corresponding to the preprocessing command PCMD, and may control a subcore that has been selected among the first to third subcores 121 to 123, to perform the identified preprocessing task PT. Likewise, the main core 110 may receive, from the controller 10, the operation command CMD subsequent to the preprocessing command PCMD, may identify one or more main tasks of the operation OP corresponding to the operation command CMD, and may control one or more subcores that have been selected among the first to third subcores 121 to 123, to perform the identified main tasks.

The main core 110 may control the execution of tasks of the first to third subcores 121 to 123 by controlling semaphores corresponding to the first to third subcores 121 to 123, respectively, through the semaphore manager 1000. At given timing, the semaphore of each subcore may be in a locked state or an unlocked state. The main core 110 may lock or unlock each subcore through the semaphore manager 1000.

Specifically, the main core 110 may control the semaphore manager 1000 to unlock a subcore which is to perform a task. For example, the main core 110 may control the semaphore manager 1000 to unlock the subcore by using an unlocking signal.

Furthermore, when the subcore completes the task, the main core 110 may control the semaphore manager 1000 to lock the subcore so that the subcore is in an initial state (or a preparation state). Furthermore, the main core 110 may control the semaphore manager 1000 to lock a subcore that is performing a task in the unlocked state so that the subcore holds or temporarily interrupts the task. For example, the main core 110 may control the semaphore manager 1000 to lock the subcore by using a locking signal.

Furthermore, when a predetermined interruption condition is satisfied, the main core 110 may allow a subcore that is performing a task to enter an interruption state so that the subcore completely (i.e., not temporarily) interrupts the task. For example, the interruption condition may include the time when a task having higher priority than that of a task being performed needs to be first performed, the time when a task being performed is redundant with another task, or the time when an error occurs in a task being performed. The main core 110 may make the state of the subcore the interruption state by transmitting an interruption signal to the subcore. The main core 110 may control the semaphore manager 1000 to lock the subcore in the interruption state so that the subcore is in the initial state (or the preparation state).

Each of the first to third subcores 121 to 123 may perform a task under the control of the main core 110. The task to be performed by each of the first to third subcores 121 to 123 may be assigned before a command is received. Accordingly, when being unlocked, each of the first to third subcores 121 to 123 may perform a pre-assigned task without a need to receive the task from the main core 110. Each of the first to third subcores 121 to 123 is previously assigned with a plurality of tasks.

According to an embodiment, after receiving a command, each of the first to third subcores 121 to 123 may be assigned with a task. For example, when unlocking a subcore, the main core 110 may transfer, to the subcore, a task that needs to be performed by the subcore.

The first to third subcores 121 to 123 may be in the locked state when the memory device 100 is powered on. When being unlocked, each of the first to third subcores 121 to 123 may perform a task. When being locked while performing a task, each of the first to third subcores 121 to 123 may hold or temporarily interrupt the task being performed. When entering the interruption state while performing a task, each of the first to third subcores 121 to 123 may completely interrupt the task being performed.

According to an embodiment, the main core 110 may control the semaphore manager 1000 to unlock a plurality of subcores in parallel. The plurality of subcores that have been unlocked together may perform tasks in parallel.

The memory region 130 may include memory cells (not illustrated) in which data is substantially stored, and may include a peripheral circuit (not illustrated) for controlling the memory cells. The memory region 130 may operate to store data under the control of the main core 110 and the first to third subcores 121 to 123.

The semaphore manager 1000 may manage the semaphores of the first to third subcores 121 to 123 under the control of the main core 110, and may lock or unlock each of the first to third subcores 121 to 123 based on the semaphores. A configuration and operating method of the semaphore manager 1000 will be described in detail with reference to FIG. 3.

Figure 3:
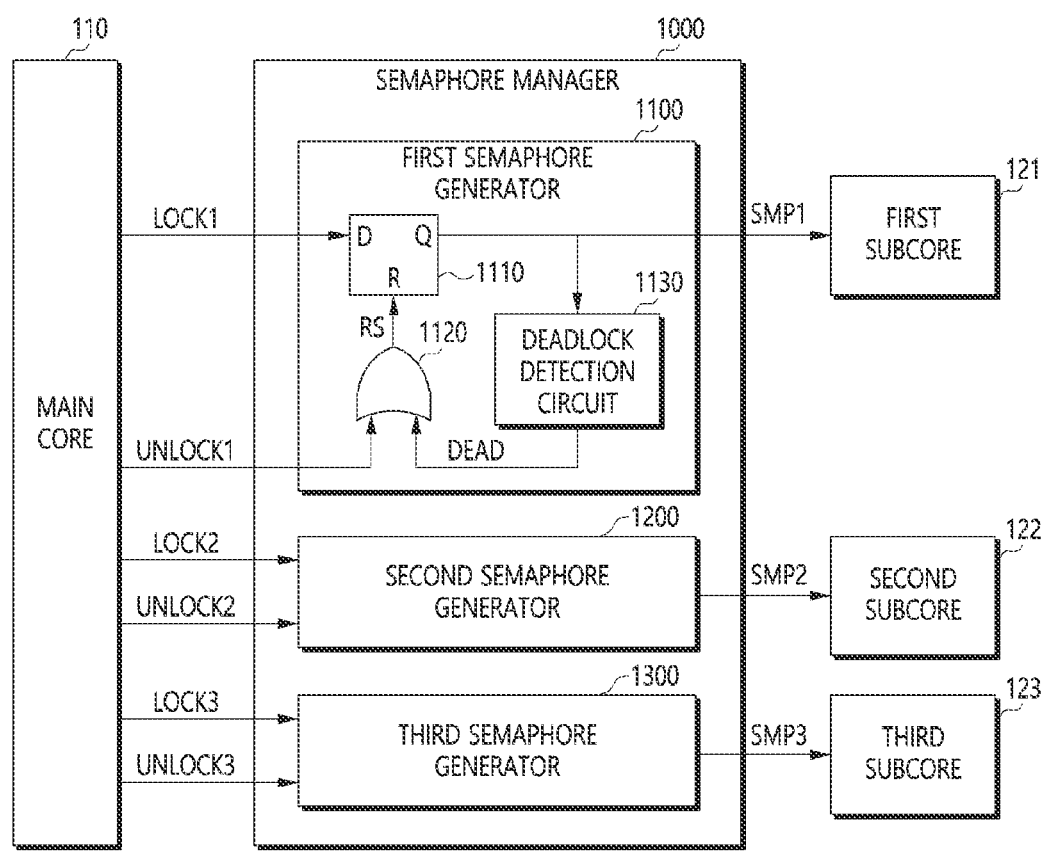
FIG. 3 is a circuit diagram illustrating a semaphore manager shown in FIG. 2.

FIG. 3 is a detailed diagram of the semaphore manager 1000 shown in FIG. 2.

Referring to FIG. 3, the semaphore manager 1000 may include first to third semaphore generators 1100 to 1300 corresponding to the first to third subcores 121 to 123, respectively. The first to third semaphore generators 1100 to 1300 may transmit first to third semaphore signals SMP1 to SMP3 to the first to third subcores 121 to 123, in response to first to third locking signals LOCK1 to LOCK3 and first to third unlocking signals UNLOCK1 to UNLOCK3, respectively. Each of the first to third semaphore generators 1100 to 1300 may receive a corresponding locking signal and an unlocking signal from the main core 110. For example, the first semaphore generator 1100 may receive the first locking signal LOCK1 and the first unlocking signal UNLOCK1 from the main core 110. The first to third semaphore signals SMP1 to SMP3 may be signals for locking or unlocking the first to third subcores 121 to 123, respectively.

The first to third semaphore generators 1100 to 1300 may have a similar configuration and may similarly operate. The first semaphore generator 1100 is described as an example. The first semaphore generator 1100 may be connected to the main core 110 and the first subcore 121. The first semaphore generator 1100 may transmit the first semaphore signal SMP1 to the first subcore 121 under the control of the main core 110. The first semaphore generator 1100 may generate the first semaphore signal SMP1 in response to the first locking signal LOCK1 and the first unlocking signal UNLOCK1 that have been received from the main core 110.

The first subcore 121 may be locked in response to the first semaphore signal SMP1 having a first value (e.g., 1), and may be unlocked in response to the first semaphore signal SMP1 having a second value (e.g., 0).

The first semaphore generator 1100 may include a semaphore memory 1110, an unlocking detection circuit 1120, and a deadlock detection circuit 1130.

The semaphore memory 1110 may receive the first locking signal LOCK1 and a reset signal RS, and may output the first semaphore signal SMP1. The semaphore memory 1110 may output the first semaphore signal SMP1 having a first value in response to the first locking signal LOCK1 that has been received from the main core 110. For example, the first locking signal LOCK1 may be transmitted in the form of a pulse that is activated at a logic high level. Furthermore, the semaphore memory 1110 may output the first semaphore signal SMP1 having a second value in response to the reset signal RS. In an embodiment, the semaphore memory 1110 may include a flipflop circuit.

The unlocking detection circuit 1120 may generate the reset signal RS in response to the first unlocking signal UNLOCK1 and a deadlock signal DEAD. When the first unlocking signal UNLOCK1 from the main core 110 is activated or the enabled deadlock signal DEAD from the deadlock detection circuit 1130 is activated, the unlocking detection circuit 1120 may activate the reset signal RS. For example, the first unlocking signal UNLOCK1 may be transmitted in the form of a pulse that is activated at a logic high level. For example, the reset signal RS may be activated at a logic high level. In an embodiment, the unlocking detection circuit 1120 may include an OR gate.

The deadlock detection circuit 1130 may generate the deadlock signal DEAD in response to the first semaphore signal SMP1. When a predetermined time elapses after the first semaphore signal SMP1 has the first value, the deadlock detection circuit 1130 may activate the deadlock signal DEAD. For example, the deadlock signal DEAD may be activated at a logic high level. In an embodiment, the deadlock detection circuit 1130 may include a plurality of flipflops that are connected in series.

Figure 4:
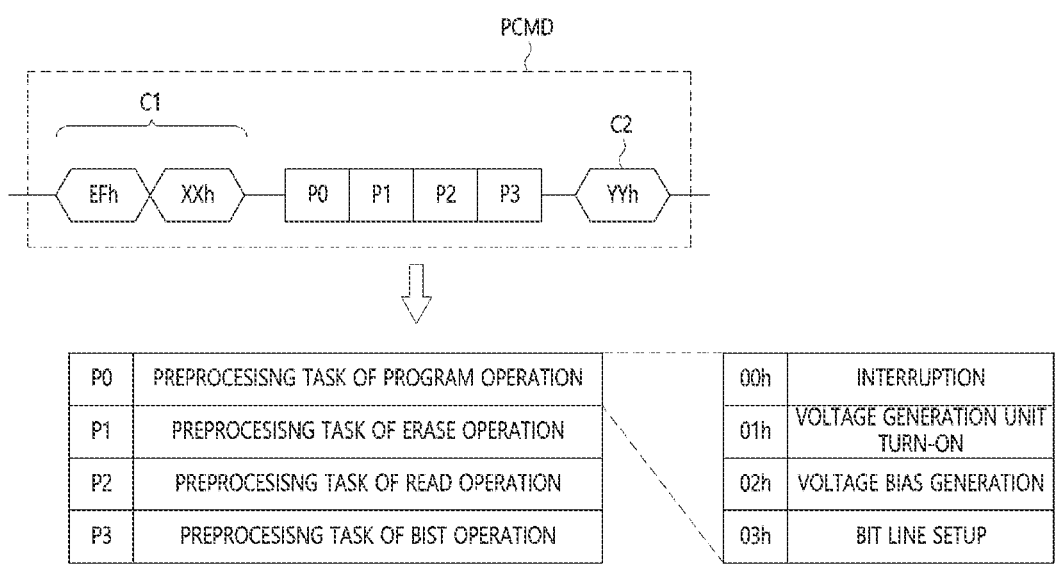
FIG. 4 is a diagram for describing a format of a preprocessing command according to an embodiment of the present disclosure.

FIG. 4 is a diagram for describing a format of the preprocessing command PCMD according to an embodiment of the present disclosure.

Referring to FIG. 4, the second processor 12 may transmit, to the memory device 100, the preprocessing command PCMD corresponding to each preprocessing task PT, according to a predetermined agreement with the memory device 100. When an operation of the memory device 100 includes a plurality of preprocessing tasks PT, a plurality of preprocessing commands PCMD corresponding to the respective preprocessing tasks PT may be transmitted.

Specifically, the preprocessing command PCMD may include a first command code C1, a plurality of parameters P0 to P3, and a second command code C2. For example, the first command code C1 may be a set feature command, and the second command code C2 may be a predetermined preprocessing indication command indicative of the preprocessing task PT. For example, first to fourth parameters P0 to P3 may be included in the preprocessing command PCMD.

The first to fourth parameters P0 to P3 may correspond to different types of an operation of the memory device 100, respectively. The value of each of the first to fourth parameters P0 to P3 may indicate a specific preprocessing task PT in a corresponding type of an operation. For example, the first parameter P0 may indicate a preprocessing task PT of a program operation. The second parameter P1 may indicate a preprocessing task PT of an erase operation. The third parameter P2 may indicate a preprocessing task PT of a read operation. The fourth parameter P3 may indicate a preprocessing task PT of a built-in self-test (BIST) operation.

For example, when the first parameter P0 is 01h, the main core 110 may determine a preprocessing task PT corresponding to the preprocessing command PCMD as a voltage generation unit turn-on task of a program operation. The voltage generation unit turn-on task may be a task to turn on a voltage generation unit (not illustrated) that is included in the memory device 100.

When the first parameter P0 is 02h, the main core 110 may determine a preprocessing task PT corresponding to the preprocessing command PCMD as a voltage bias generation task of a program operation. The voltage bias generation task may be a task to generate various voltage biases that are used in a program operation.

When the first parameter P0 is 03h, the main core 110 may determine a preprocessing task PT corresponding to the preprocessing command PCMD as a bit line setup task of a program operation. The bit line setup task may be a task to set up a bit line that is connected to a memory cell in which data will be stored.

Furthermore, when the first parameter P0 is 00h, the main core 110 may interrupt a preprocessing task PT of a program operation that is being performed.

Figure 5:
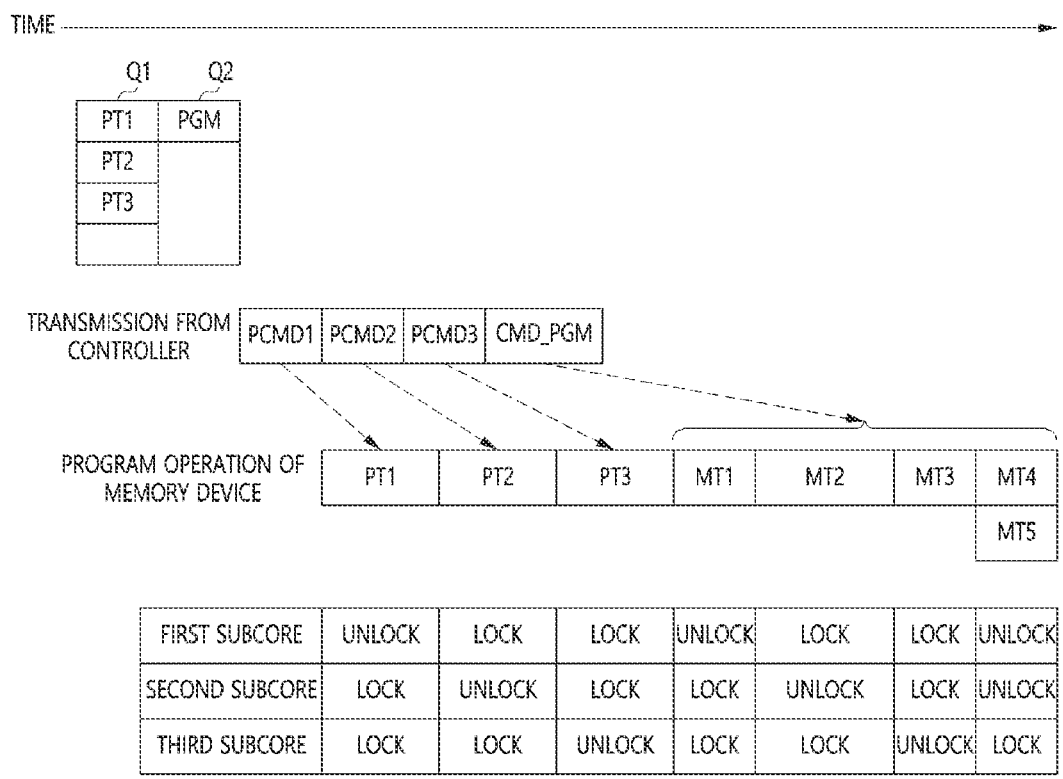
FIG. 5 is a diagram for describing a method of performing, by the storage device, a program operation according to an embodiment of the present disclosure.

FIG. 5 is a diagram for describing a method of performing, by the storage device 1, a program operation PGM according to an embodiment of the present disclosure.

Referring to FIG. 5, the controller 10 may control the memory device 100 to perform the program operation PGM. The first processor 11 may queue first to third preprocessing tasks PT1 to PT3 of the program operation PGM in the first queue Q1, and may queue the program operation PGM in the second queue Q2. The first to third preprocessing tasks PT1 to PT3 of the program operation PGM may be a voltage generation unit turn-on task, a voltage bias generation task, and a bit line setup task, respectively, for example.

The second processor 12 may generate first to third preprocessing commands PCMD1 to PCMD3 for the first to third preprocessing tasks PT1 to PT3 of the first queue Q1, respectively, and may sequentially transmit the first to third preprocessing commands PCMD1 to PCMD3 to the memory device 100. Each of the first to third preprocessing commands PCMD1 to PCMD3 may have the format of the preprocessing command PCMD that has been described with reference to FIG. 4. Furthermore, as described with reference to FIG. 4, the first parameters P0 of the first to third preprocessing commands PCMD1 to PCMD3 may be 01h, 02h, and 03h, respectively.

Furthermore, after transmitting the first to third preprocessing commands PCMD1 to PCMD3, the second processor 12 may generate a program command CMD_PGM for the program operation PGM of the second queue Q2, and may transmit the program command CMD_PGM to the memory device 100. The program command CMD_PGM may include a program command code, an address, and data.

The memory device 100 may perform the first preprocessing task PT1 in response to the first preprocessing command PCMD1, may perform the second preprocessing task PT2 in response to the second preprocessing command PCMD2, and may perform the third preprocessing task PT3 in response to the third preprocessing command PCMD3. More specifically, the main core 110 may control the semaphore manager 1000 to unlock the first subcore 121 in response to the first preprocessing command PCMD1, and may perform the first preprocessing task PT1 when the first subcore 121 is unlocked. While the first subcore 121 operates, the second subcore 122 and the third subcore 123 may be in the locked state. When the first subcore 121 completes the first preprocessing task PT1, the main core 110 may lock the first subcore 121. Likewise, under the control of the main core 110, the second subcore 122 may perform the second preprocessing task PT2, and the third subcore 123 may perform the third preprocessing task PT3. As described above, which task each of the first to third subcores 121 to 123 will perform may be predetermined before receiving a command or may be determined when receiving the command. Since the third preprocessing task PT3 is the bit line setup task, the third preprocessing task PT3 may be performed after data that is included in the program command CMD_PGM is received.

The memory device 100 may perform first to fifth main tasks MT1 to MT5 of the program operation PGM in response to the program command CMD_PGM. Specifically, the main core 110 may selectively unlock subcores to which the first to fifth main tasks MT1 to MT5 have been assigned, respectively, among the first to third subcores 121 to 123, in response to the program command CMD_PGM. When being unlocked, each of the first to third subcores 121 to 123 may perform a main task that has been assigned to each subcore.

As illustrated, the first to third main tasks MT1 to MT3 need to be sequentially performed. Accordingly, the main core 110 may sequentially unlock the first to third subcores 121 to 123 so that the first to third subcores 121 to 123 sequentially perform the first to third main tasks MT1 to MT3. Furthermore, the fourth and fifth main tasks MT4 and MT5 may be performed in parallel. Accordingly, the main core 110 may control the semaphore manager 1000 to unlock the first and second subcores 122 and 123 in parallel so that the first and second subcores 122 and 123 perform the fourth and fifth main tasks MT4 and MT5 in parallel.

The first to fifth main tasks MT1 to MT5 may be the remaining tasks except the first to third preprocessing tasks PT1 to PT3, among tasks that form the program operation PGM. The first to fifth main tasks MT1 to MT5 of the program operation PGM may be a word line selection task, a program voltage application task, a verification task, a parameter calculation task, and a word line selection task, respectively. The word line selection task may be a task to select a word line that is connected to a memory cell in which data will be stored and to control a voltage of the word line. The program voltage application task may be a task to apply a program voltage to a word line. The verification task may be a task to verify whether the program operation PGM has been completed. The parameter calculation task may be a task to calculate a new operation parameter when the program operation PGM needs to be continuously performed. The first to fifth main tasks MT1 to MT5 of the program operation PGM may be predetermined.

Since the first to third preprocessing tasks PT1 to PT3 are performed by the first to third subcores 121 to 123 before the program command CMD_PGM is received, the latency of the program operation PGM can be reduced, and operation performance of the storage device 1 can be improved. Furthermore, since the first to third subcores 121 to 123 can operate in parallel through control of semaphores, a reduction in the latency of the program operation PGM can be maximized.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all technical spirits within an equivalent range of the present disclosure should be construed as being included in the scope of rights of the present disclosure. Furthermore, the embodiments may be combined to form additional embodiments.

What is claimed is:

1. A memory device comprising:
a memory region;
a plurality of subcores; and
a main core configured to control a subcore of the plurality of subcores to perform a preprocessing task in response to a preprocessing command and control one or more subcores of the plurality of subcores to perform one or more main tasks in response to an operation command subsequent to the preprocessing command,
wherein the preprocessing task includes a sub-operation of setting a peripheral circuit coupled to a target location in the memory region before accessing the target location, and
wherein the one or more main tasks includes a sub-operation of accessing the target location.

2. The memory device of claim 1, wherein the main core is configured to:
unlock the subcore so that the subcore performs the preprocessing task, and
lock the subcore so that the subcore is in an initial state when the subcore completes the preprocessing task.

3. The memory device of claim 1, wherein the main core is configured to unlock the plurality of subcores in parallel so that the plurality of subcores perform a plurality of tasks in parallel.

4. The memory device of claim 1, further comprising a semaphore manager configured to manage a semaphore of the subcore under a control of the main core, wherein the semaphore is in a locked state or an unlocked state.

5. The memory device of claim 4, wherein:
the semaphore manager is configured to output a semaphore signal having a first value in response to a locking signal that is received from the main core, and output the semaphore signal having a second value in response to an unlocking signal that is received from the main core, and
the subcore is configured to be locked in response to the semaphore signal having the first value, and be unlocked in response to the semaphore signal having the second value.

6. The memory device of claim 5, wherein the semaphore manager is configured to output the semaphore signal having the second value when a predetermined time elapses after the semaphore signal has the first value.

* * * * *